(12) United States Patent
DuPuis et al.

(10) Patent No.: US 7,849,870 B2
(45) Date of Patent: Dec. 14, 2010

(54) PIEZOELECTRIC PRESSURE CONTROL VALVE

(75) Inventors: Paul DuPuis, Glendale, AZ (US); Lee Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/105,978

(22) Filed: Apr. 18, 2008

(65) Prior Publication Data

US 2009/0114286 A1 May 7, 2009

Related U.S. Application Data

(63) Continuation-in-part of application No. 11/934,000, filed on Nov. 1, 2007.

(51) Int. Cl.
*F16K 31/02* (2006.01)

(52) U.S. Cl. .................. 137/14; 137/487.5; 251/86; 251/129.04; 251/129.06

(58) Field of Classification Search ............ 251/129.04, 251/129.06, 84, 86, 359; 137/2, 12, 14, 487.5, 137/596
See application file for complete search history.

(56) References Cited

U.S. PATENT DOCUMENTS

| | | | |
|---|---|---|---|
| 4,131,130 A | | 12/1978 | Ruby |
| 4,617,952 A | * | 10/1986 | Fujiwara et al. ............... 137/85 |
| 4,762,300 A | * | 8/1988 | Inagaki et al. .......... 251/129.06 |
| 5,085,399 A | * | 2/1992 | Tsutsui et al. ............ 251/30.03 |
| 5,340,081 A | * | 8/1994 | Wright .................. 251/129.06 |
| 5,381,817 A | * | 1/1995 | Gassman et al. .............. 137/82 |
| 5,628,411 A | * | 5/1997 | Mills et al. .................. 209/644 |
| 5,779,218 A | * | 7/1998 | Kowanz .................. 251/129.06 |
| 6,202,669 B1 | | 3/2001 | Vetsch et al. |
| 6,450,204 B2 | * | 9/2002 | Itzhaky ........................ 137/883 |
| 6,705,347 B2 | * | 3/2004 | Itzhaky .................. 137/625.65 |
| 2004/0000843 A1 | * | 1/2004 | East ........................... 310/331 |
| 2007/0045579 A1 | * | 3/2007 | Wirtl et al. ............. 251/129.04 |

FOREIGN PATENT DOCUMENTS

| | | |
|---|---|---|
| GB | 2163833 | 3/1986 |
| GB | 2181278 | 4/1987 |

OTHER PUBLICATIONS

UK Intellectual Property Office, "International Search Report", Jun. 24, 2009, Published in: GB.

* cited by examiner

*Primary Examiner*—John Bastianelli
(74) *Attorney, Agent, or Firm*—Fogg & Powers LLC

(57) ABSTRACT

A pressure control valve having a common plenum formed by two flow control valves that each utilize electrically controlled piezoelectric actuators to generate a number of possible operating states and thus control an output pressure from the common plenum formed by the two flow control valves. The flow control valves each have at least one pressure fitting and nozzle, and a nozzle orifice sealing mechanism coupled to the piezoelectric actuator. The piezoelectric actuator may be a piezo-ceramic actuator fixed along one side to a chamber of the flow control valve and having a free side opposite the fixed side. Upon receiving a voltage of a desired magnitude and polarity, the free side of the piezo-ceramic actuator and the nozzle orifice sealing mechanism moves to control a fluid flow into the common plenum. By controllably dithering the piezoelectric actuators, the output pressure from the common plenum may be accurately regulated.

20 Claims, 4 Drawing Sheets

PIEZOELECTRIC PRESSURE CONTROL VALVE

PRIORITY

This application is a continuation-in-part application and claims priority to U.S. patent application Ser. No. 11/934,000 filed on Nov. 1, 2007, the subject matter of which is incorporated herein by reference in its entirety.

BACKGROUND OF THE INVENTION

Flow control valves are used to control fluid flow rates in a variety of applications. One particular application relates to controlling a fluid (e.g. gas or liquid) flow in a pneumatic test apparatus when testing various pneumatic pressure systems or components that are to be installed on an aircraft. By way of example, one type of pneumatic test apparatus is an air data tester (ADT), which is often employed in ground testing aircraft aerospace systems or components. One type of aerospace test system simulates in-flight air pressures to supply pneumatic data to an aircraft control and display avionics system, which in turn provides data regarding the aircraft's altitude, vertical speed, airspeed, Mach number, etc.

The flow control valve must be capable of precisely duplicating in-flight pneumatic pressures normally encountered by an aircraft over its entire flight profile. Existing valves, such as those described in U.S. Pat. Nos. 4,131,130 and 6,202,669 are generally complex assemblies that are sensitive to a number of individual part tolerances between nozzle orifices. The valves described in the identified patents include an electromagnetic torque motor for moving a flapper mechanism relative to a nozzle orifice of a pressure fitting. Due to the complexity of the assemblies and the interrelated mechanical tolerance sensitivity, the aforementioned valves are difficult to manufacture in large quantities in a short period of time. In addition, the complex assembly increases cost.

SUMMARY OF THE INVENTION

The present invention generally relates to a pressure control valve having a common plenum formed by two flow control valves that each utilizes an electrically controlled piezoelectric actuator in lieu of the above-described electromagnetic pressure control system. The piezoelectric actuator and other components of the valve are much less sensitive to, if not immune from, the above-described interrelated mechanical tolerances between the nozzle orifices, the complex geometry and the precise manufacturing tolerances required for prior art valves. Further, the piezoelectric actuator and other components of the valve are more easily assembled and more easily calibrated. In addition, the two flow control valves may be operated independently to generate a number of possible operating states and thus control an output pressure from a common plenum formed by the two stacked flow control valves.

In one aspect of the invention, a pressure control valve includes a first flow control valve having a first chamber in fluid communication with a first port and a first pressure fitting received in the first port. Further, the first flow control valve includes a first adjustable nozzle with one end portion located within the first chamber; a first sealing member located within the first chamber proximate the one end portion; and a first piezoelectric actuator located within the first chamber and coupled to the first sealing member. A second flow control valve includes a second chamber in fluid communication with a second port. Further, the second flow control valve may be identical to the first and includes a second pressure fitting received in the second port and having a second adjustable nozzle with one end portion located within the second chamber; a second sealing member located within the second chamber proximate the one end portion; and a second piezoelectric actuator located within the second chamber and coupled to the second sealing member. The first chamber and the second chamber are in fluid communication and form a common plenum. And, the actuation of the piezoelectric actuators moves a free face of the piezoelectric actuators to control fluid flow between the nozzles and the common plenum and thus control an output pressure from the common plenum.

In another aspect of the invention, a method for regulating an output pressure from a pressure control valve includes the steps of (1) controllably exchanging a first amount of fluid through an adjustable nozzle extending into a chamber formed within a first flow control valve, the adjustable nozzle controllable to be in an open or closed position based on movement of a piezoelectric actuator positioned proximate the adjustable nozzle; (2) controllably exchanging a second amount of fluid through an adjustable nozzle extending into a chamber formed within a second flow control valve, the adjustable nozzle controllable to be in an open or closed position based on movement of a piezoelectric actuator positioned proximate the adjustable nozzle; and (3) selecting the piezoelectric actuator of the first flow control valve to be in a first state and the piezoelectric actuator of second flow control valve to be in a second state, the selected states operable to obtain a desired output pressure from a common plenum formed by the chambers of the first and second flow control valves.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
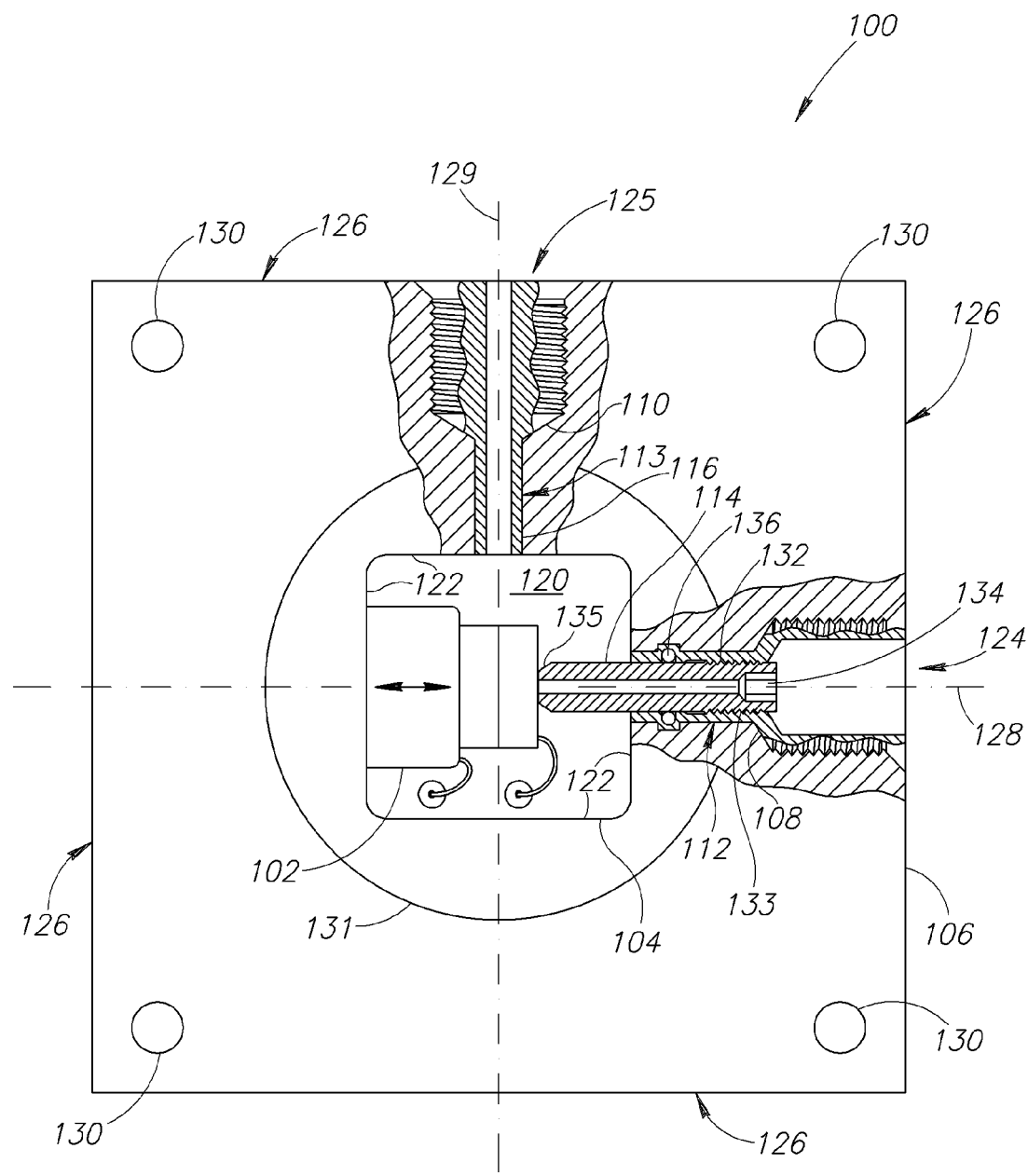
FIG. 1 is a top plan schematic view of a flow control valve having an piezoelectric actuator according to an embodiment of the invention.

FIG. 1 shows a flow control valve 100 having a piezoelectric actuator 102 located within a chamber 104 of a valve support structure 106 according to an embodiment of the invention. The flow control valve 100 may be used to control a flow of fluid into the chamber 104. The flow control valve 100 may be employed to proportionally modulate the flow into the chamber 104 to achieve a desired output flow rate of the fluid. The flow control valve 100 further includes a first pressure fitting 108 and a second pressure fitting 110 coupled to and positioned within passages 112, 113 formed in the support structure 106. In the illustrated embodiment, an adjustable nozzle 114 is coupled to the first pressure fitting 108 and a fixed orifice 116 coupling the second pressure fitting 110 to the plenum chamber 104.

In one embodiment, the support structure 106 is a machined, one-inch (25.40 millimeters) thick plate having approximately a two-inch (50.80 millimeters) square area (width multiplied by length). The plate may be made from a variety of materials, such as aluminum, steel, titanium, etc. Machining material out of the support structure 106 forms the chamber 104. The chamber 104 may take a variety of shapes, but preferably does not extend through the thickness of the plate. In the event that the chamber 104 extends through the thickness of the support structure 106, a cover plate (not shown) may be used to close off an exterior side of the chamber 104. In the illustrated embodiment, the chamber 104 is relatively square having a floor surface 120 and four inner side walls 122.

The passages 112, 113 for the pressure fittings 108, 110 extend, respectively, from the inner side walls 122 of the chamber 104 through the support structure 106 to openings 124, 125 on exterior surfaces 126 of the support structure 106. In one embodiment, the passages 112, 113 have respective longitudinal axes 128, 129, which are arranged substantially perpendicular to each other. For example the passage 112 with longitudinal axis 128 is positioned at a three o'clock position while the passage 113 with longitudinal axis 129 is positioned at a twelve o'clock position. In addition to the aforementioned features, the support structure 106 may further include mounting holes 130 for securing a cover plate (not shown) to the support structure 106. Further, the cover plate may be sized to extend beyond a groove or boundary region 131 formed in the support structure 106. The groove 131 may receive an o-ring seal (not shown).

In one embodiment, both pressure fittings 108, 110 comply with military specification MS33649, but it is appreciated that other types of pressure fittings compatible with other specifications and compatible with the support structure 106 may be utilized. The pressure fittings 108, 110 are received in passages 112, 113 and along longitudinal axes 128, 129, respectively, and are coupled to the support structure 106. In the illustrated embodiment, the pressure fittings 108, 110 are threadably coupled to or tapped into the support structure 106. The first pressure fitting 108 includes the adjustable nozzle 114 while the second pressure fitting 110 includes the fixed orifice 116. At least a portion of the nozzle 114 extends into the chamber 104.

The adjustable nozzle 114 includes an engagement portion 132 for coupling the adjustable nozzle 114 to the first pressure fitting 108. In one embodiment, the engagement portion 132 includes finely machined threads 133 that allow the adjustable nozzle 114 to be moved in small increments relative to the support structure 106. The engagement portion 132 is received by a complementary portion of the first pressure fitting 108. Adjustment of the adjustable nozzle 114 may be achieved with a tool engagement opening 134, which may take the form of a hex setscrew configured to receive a hex-shaped tool (not shown). In one embodiment, the adjustable nozzle 114 includes a nose cap 135. A seal 136, such as an o-ring seal, provides a fluid-tight fit between the adjustable nozzle 114 and the first pressure fitting 108.

The piezoelectric actuator 102 is coupled to a sealing member 138 (FIG. 2), and both are located within the chamber 104. A unique aspect of the piezoelectric actuator 102 is its ability to change its dimensional shape by a small amount when subjected to an externally applied voltage of a desired polarity. Some of the more common piezoelectric materials are poly-crystalline ceramics based on lead zirconate titanate and barium titanate compositions. In some instances, additives may be added to the piezoelectric material to alter the dielectric, piezoelectric and/or physical properties of the resulting composition. In one embodiment, the piezoelectric actuator 102 is a piezo-ceramic actuator.

Figure 2:
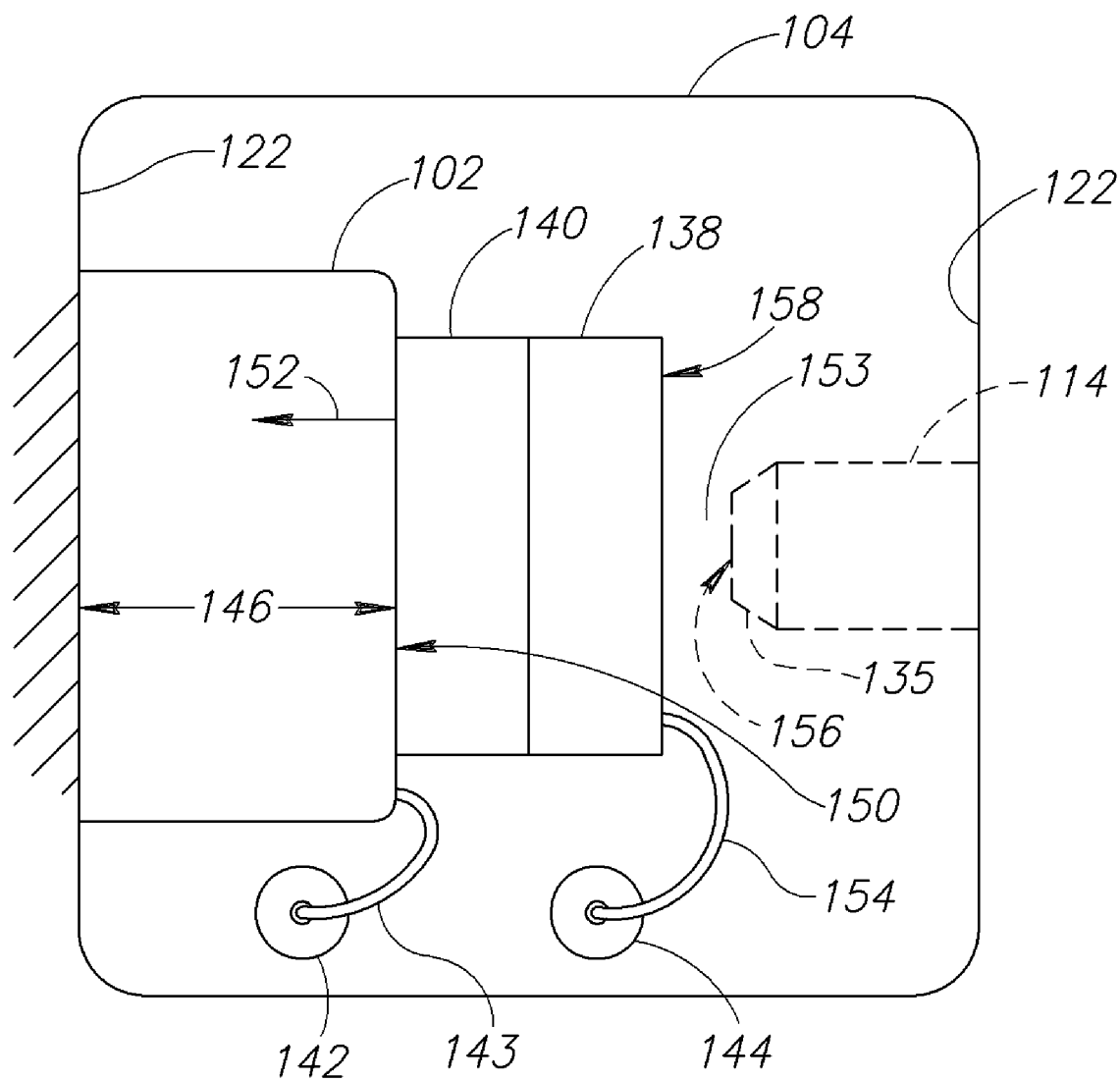
FIG. 2 is an expanded, top plan schematic view of a chamber and a piezoelectric actuator of the flow control valve of FIG. 1.

FIG. 2 is an expanded, top plan view of the chamber 104 containing only the piezoelectric actuator 102, the sealing member 138, an insulating spacer 140, and electrical feed-throughs 142, 144. Electrical excitation of the piezoelectric actuator is applied between the case (as one electrode) and the face 150 of the actuator via electrical connection 143. Electrical connection 154 is used to sense when the face 158 of the sealing surface comes in contact with a nose cap end face 156. The pressure fittings 108, 110 are not shown in detail for purposes of clarity. The piezoelectric actuator 102 is fixed to the sidewall 122 of the chamber 104 opposite the sidewall 122 that receives the adjustable nozzle 114. One side of the piezoelectric actuator 102 is grounded to the support structure 106. The other side is connected to the electrical feed-through 142 through the electrical connection 143, which takes the form of a wire. In one embodiment, alternate metallizations between ceramic donuts comprising the piezoelectric actuator 102 are connected to the support structure 106 and intervening metallizations are connected to the electrical connection 143. The support structure 106 operates as an electrical terminal. Polarities of the ceramic donuts are alternated such that the positive sides of all donuts are connected to the support structure 106 and the negative sides are connected to the electrical connection 143 or vice versa.

In addition, the piezoelectric actuator 102 is coupled to the sealing member 138 and yet electrically insulated from the sealing member 138 via the intermediate insulating spacer 140. In one embodiment, the intermediate insulating spacer 140 takes the form of a donut shaped ceramic insulator that is bonded or otherwise attached to the piezoelectric actuator 102 and to the sealing member 138.

The piezoelectric actuator 102 includes a first dimension 146 that is substantially parallel to the longitudinal axis 128 (FIG. 1) of the first passage 112. In operation, the first dimension 146 is reduced or shrunk when the piezoelectric actuator 102 is subjected to the externally applied voltage of the desired polarity via the electrical feed-through 142. The reduction of the first dimension 146 causes a free face 150 of the piezoelectric actuator 102, the intermediate insulating spacer 140 and the sealing member 138 to move away from the nose cap end face 156 of the adjustable nozzle 114 in a direction indicated by an arrow 152. It is understood that other dimensions of the piezoelectric actuator 102 may be altered when subjected to the externally applied voltage, but for purposes of this description the changes in those other dimensions are not expected to effect the desired operation of the piezoelectric actuator 102 in controlling a gap 153 between the nose cap 135 of the adjustable nozzle 114.

In one embodiment, the sealing member 138 is a self-aligning valve-orifice sealing mechanism coupled to the insulating spacer 140. The self-aligning valve-orifice sealing mechanism may take the form of a spherical valve-orifice sealing device as described in U.S. Pat. No. 6,202,669 or may take other forms commonly employed for sealing a flow orifice. The sealing member 138 is electrically conductive and is attached to the electrical connection 154, which is further coupled to the electrical feed-through 144. The conductive path may be advantageously used to measure distance (by capacitance) and contact (by resistance) between the nose cap end face 156 of the adjustable nozzle 114 and an end face 158 of the sealing member 138.

In operation, fluid flows through the adjustable nozzle 114 from the first pressure fitting 108. To receive the fluid into the chamber 104, the dimension 146 of the piezoelectric actuator 102 is changed or displaced by altering the magnitude and/or polarity of the voltage applied to the piezoelectric actuator 102.

Figure 3:
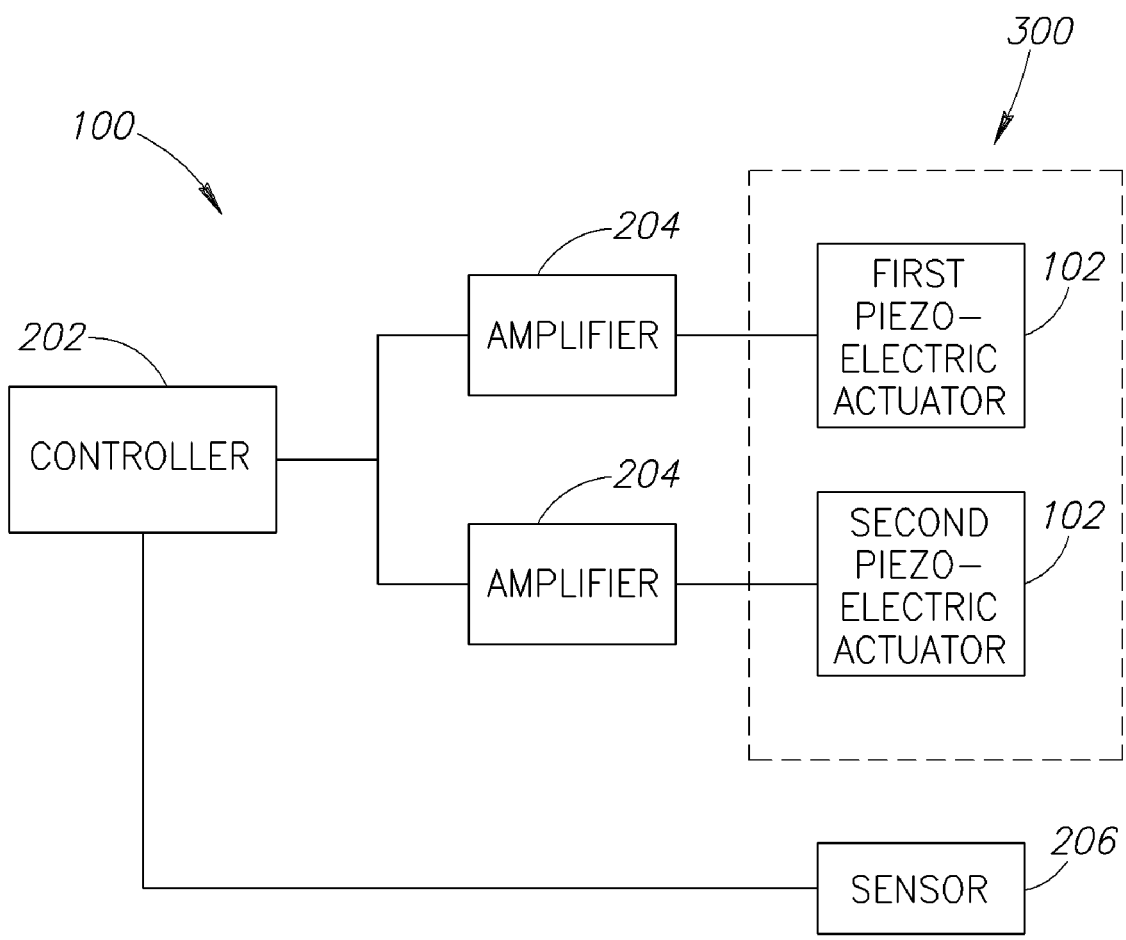
FIG. 3 is a schematic diagram of a control system for controlling a voltage applied to a piezoelectric actuator of a flow control device.

FIG. 3 shows a control system 200 having a controller 202 for controlling amplifiers 204 that supply the voltage magnitude and polarity necessary to drive the stacked piezoelectric actuators 102 of the pressure control valve 300, as described below. A sensor 206 is in fluid communication with the chamber 104 to detect a flow or a pressure of the fluid within or about to exit the chamber 104. The sensor 206 transmits a signal to the controller 202, and based on the signal from the sensor 206, the controller 202 may alter the applied voltage level and/or polarity from the amplifiers 204 to thus control or regulate an output flow from the flow control valves 100.

Figure 4:
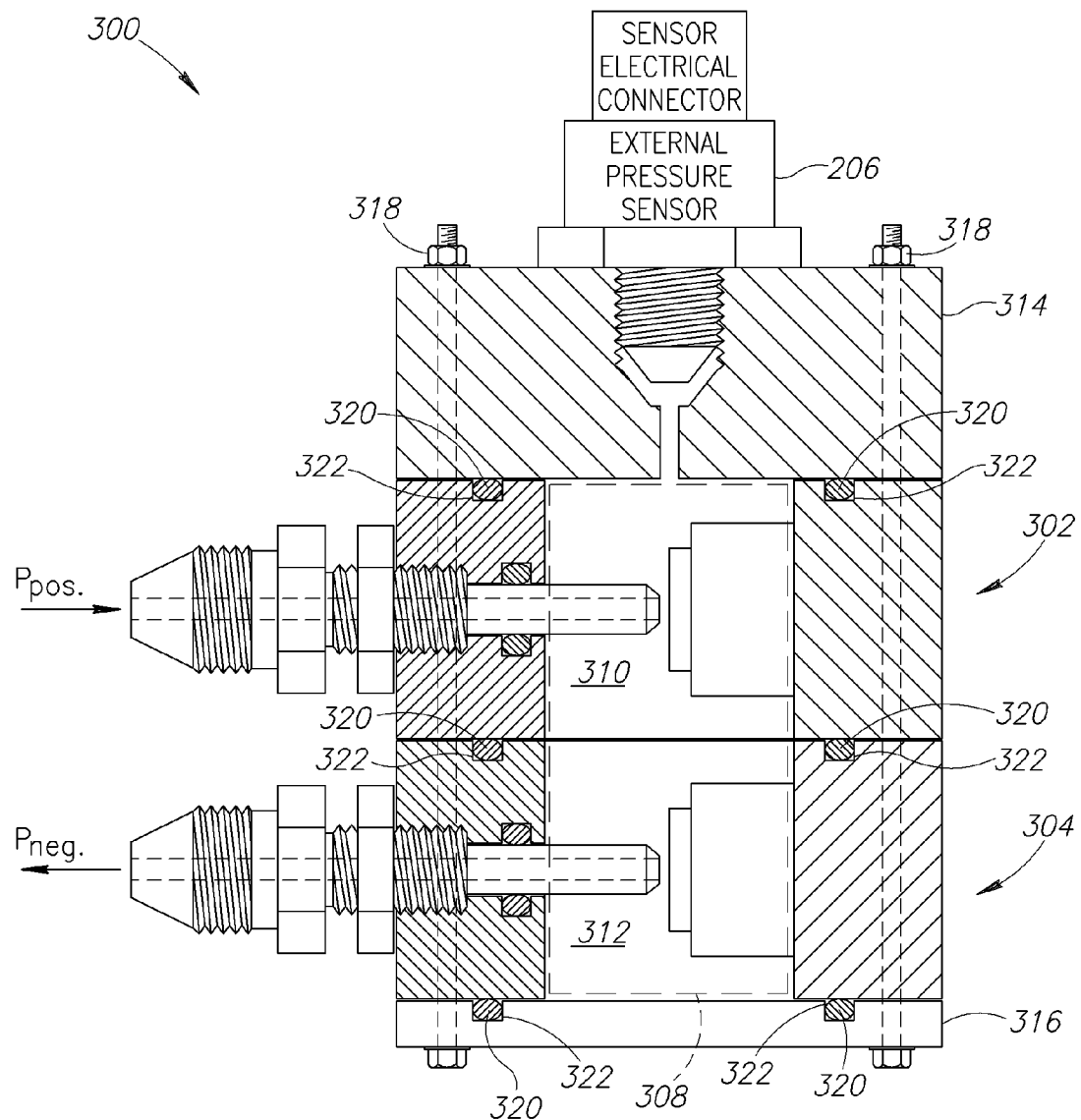
FIG. 4 is a cross-sectional view of a pressure control valve having a common plenum formed by two flow control valves according to an embodiment of the invention.

FIG. 4 shows a pressure control valve 300 having a first flow control valve 302 stacked or otherwise arranged adjacent to or proximate a second flow control valve 304. The pressure control valve 300 operates to proportionally modulate the pressure within a combined chamber or common plenum 308 formed by the first and second flow control valves 302, 304 to achieve a desired output pressure. The chambers 310, 312 of the first and second valves 302, 304, respectively combine to form the common plenum 308. By way of example, the first flow control valve 302 operates as a positive pressure control device to control the flow of positively pressurized fluid, $P_{POS.}$, into the common plenum 308 while the second flow control valve functions as a negative pressure control device to selectively subject the common plenum 308 to a vacuum, $P_{NEG.}$, and thus control the pressure of the pressurized fluid within the common plenum 308. Alternatively, the first flow control valve 302 may operate as a negative pressure control device and the second flow control valve may operate as a positive pressure control device. In operation, the pressure in the common plenum 308 is controlled through a dithering process where the piezoelectric actuators of both flow control valves 302, 304 are placed in desired states to provide a desired output pressure. By way of example, the respective valves 302, 304 may be opened and closed in short pulses to obtain fine control of the desired output pressure.

The flow control valves 302, 304 may operate and be controlled independently with the following possible states of each valve:

| | | |
|---|---|---|
| Valve 1 = Closed | Valve 2 = Closed | Holds current pressure within the common plenum; |
| Valve 1 = Closed | Valve 2 = Open | Applies vacuum to reduce net output pressure; |
| Valve 1 = Open | Valve 2 = Closed | Applies positive pressure to increase net output pressure; and |
| Valve 1 = Open | Valve 2 = Open | Mixes positive pressure and negative pressure in the common plenum. |

In the illustrated embodiment, the pressure control valve 300 includes a first closure plate 314 and a second closure plate 316 coupled together and arranged to maintain the valves 302, 304 in sealing contact with one another. The closure plates 314, 316 may be mechanically fastened to each other through various mechanical coupling means, such as using fasteners 318, which may take the form of bolts, rods, etc. Seals 320, such as o-ring seals, provide hydraulic sealing between the valves 302, 304 and between the closure plates 314, 316 and valves 302, 304, respectively. The seals 320 may be located in grooves 322 formed in one or both of the valves 302, 304 and closure plates 314, 316.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The invention claimed is:

1. A pressure control valve comprising:
a first flow control valve having a first chamber in fluid communication with a first port and a first pressure fitting received in the first port and having a first adjustable nozzle with one end portion located within the first chamber, a first sealing member located within the first chamber proximate the one end portion, and a first piezoelectric actuator located within the first chamber and coupled to the first sealing member; and
a second flow control valve having a second chamber in fluid communication with a second port and a second pressure fitting received in the second port and having a second adjustable nozzle with one end portion located within the second chamber, a second sealing member located within the second chamber proximate the one end portion, and a second piezoelectric actuator located within the second chamber and coupled to the second sealing member,
wherein the first chamber and the second chamber are in fluid communication and form a common plenum, and
wherein actuation of the piezoelectric actuators moves a free face of the piezoelectric actuators to control fluid flow between the nozzles and the common plenum and thus control an output pressure from the common plenum.

2. The pressure control valve of claim 1, further comprising a first closure plate coupled to a second closure plate, the first and second closure plates cooperating to force the first flow control valve into sealing contact with the second flow control valve.

3. The pressure control valve of claim 2 wherein the first closure plate is bolted to the second closure plate.

4. The pressure control valve of claim 1, wherein a voltage is supplied at a desired level and a desired polarity to achieve a dimensional change of the piezoelectric actuators in a direction substantially parallel to longitudinal axes of the nozzles.

5. The pressure control valve of claim 1, further comprising a seal located between the first and second flow control valves.

6. The pressure control valve of claim 2, further comprising a seal located between the first flow control valve and one of the plates.

7. The pressure control valve of claim 2, further comprising a seal located between the second flow control valve and one of the plates.

8. The pressure control valve of claim 1, wherein the first and second piezoelectric actuators are multi-layer piezo-ceramic actuators.

9. The pressure control valve of claim 8, wherein the piezo-ceramic actuators are made from the group consisting of a poly-crystalline ceramic based lead zirconate titanate composition and a barium titanate composition.

10. A method for regulating an output pressure from a pressure control valve, the method comprising:
controllably exchanging a first amount of fluid through an adjustable nozzle extending into a chamber formed within a first flow control valve, the adjustable nozzle controllable to be in an open or closed position based on movement of a piezoelectric actuator positioned proximate the adjustable nozzle;

controllably exchanging a second amount of fluid through an adjustable nozzle extending into a chamber formed within a second flow control valve, the adjustable nozzle controllable to be in an open or closed position based on movement of a piezoelectric actuator positioned proximate the adjustable nozzle; and selecting the piezoelectric actuator of the first flow control valve to be in a first state and the piezoelectric actuator of second flow control valve to be in a second state, the selected states operable to obtain a desired output pressure from a common plenum formed by the chambers of the first and second flow control valves.

11. The method of claim 10, wherein controllably exchanging includes detecting an amount of contact pressure or distance between the respective adjustable nozzles and the piezoelectric actuators of the first and second flow control valves.

12. The method of claim 10, wherein controllably exchanging includes changing a dimension of the piezoelectric actuators based on a signal received from a sensor in fluid communication with the common plenum and controlling a voltage source to provide a desired voltage level having a desired polarity and magnitude to the piezoelectric actuators.

13. The method of claim 10, wherein selecting the piezoelectric actuator of the first flow control valve to be in a first state includes placing the piezoelectric actuator of the first flow control valve in a closed state.

14. The method of claim 10, wherein selecting the piezoelectric actuator of the first flow control valve to be in a first state includes placing the piezoelectric actuator of the first flow control valve in an open state.

15. The method of claim 10, wherein selecting the piezoelectric actuator of the second flow control valve to be in a second state includes placing the piezoelectric actuator of the second flow control valve in a closed state.

16. The method of claim 10, wherein selecting the piezoelectric actuator of the second flow control valve to be in a second state includes placing the piezoelectric actuator of the second flow control valve in an open state.

17. The method of claim 10, wherein controllably exchanging the first and second amounts of fluid includes supplying pressurized air under a vacuum.

18. The method of claim 10, wherein controllably exchanging the first and second amounts of fluid includes supplying a pressurized liquid under a vacuum.

19. The method of claim 10, further comprising sealing the first and second flow control valves to closure plates with a plurality of seals.

20. The method of claim 10, further comprising fastening a pair of closure plates to force the first and second flow control valves into contact with one another and to seal the common plenum.

* * * * *